US006412273B1

(12) United States Patent
Rohs

(10) Patent No.: US 6,412,273 B1
(45) Date of Patent: Jul. 2, 2002

(54) CONTINUOUS-COMBUSTION PISTON ENGINE

(76) Inventor: Ulrich Rohs, Roonstrasse 11, 52351 Düren (DE)

( * ) Notice: Subject to any disclaimer, the term of this patent is extended or adjusted under 35 U.S.C. 154(b) by 0 days.

(21) Appl. No.: 09/519,121

(22) Filed: Mar. 6, 2000

(30) Foreign Application Priority Data

May 5, 1999 (DE) ........................................ 199 09 689

(51) Int. Cl.[7] ................................................ F02C 3/00

(52) U.S. Cl. ....................................... 60/39.63; 60/39.6

(58) Field of Search ............................... 60/39.6, 39.63; 123/56.2, 56.5

(56) References Cited

U.S. PATENT DOCUMENTS 3,893,295 A * 7/1975 Airas ........................ 60/39.63
4,179,879 A * 12/1979 Kincaid, Jr. ........... 60/39.63 X
4,448,154 A * 5/1984 Kossel .................. 123/58 BB
4,490,971 A * 1/1985 Hedelin ...................... 60/39.63
5,285,633 A * 2/1994 Duva ......................... 60/39.63
5,497,614 A * 3/1996 Duva ......................... 60/39.63
5,517,953 A * 5/1996 Wiesen .................. 123/56.2 X
5,964,087 A 10/1999 Tort-Oropeza
6,092,365 A 7/2000 Leidel

* cited by examiner

*Primary Examiner*—Hoang Nguyen
(74) *Attorney, Agent, or Firm*—Yongzhi Yang; Steven A. Hultquist; Marianne Fuierer

(57) ABSTRACT

In a continuous-combustion piston engine in which working mediums flowing out of a combustion chamber is successively fed to at least two cylinders, each of the cylinders is stationary in relationship to the combustion chamber and has an inlet. Controls are provided that successively connect the inlet to the combustion chamber and separate it from the combustion chamber. Mechanical losses are minimized in this manner.

51 Claims, 7 Drawing Sheets

CONTINUOUS-COMBUSTION PISTON ENGINE

Figure 1:
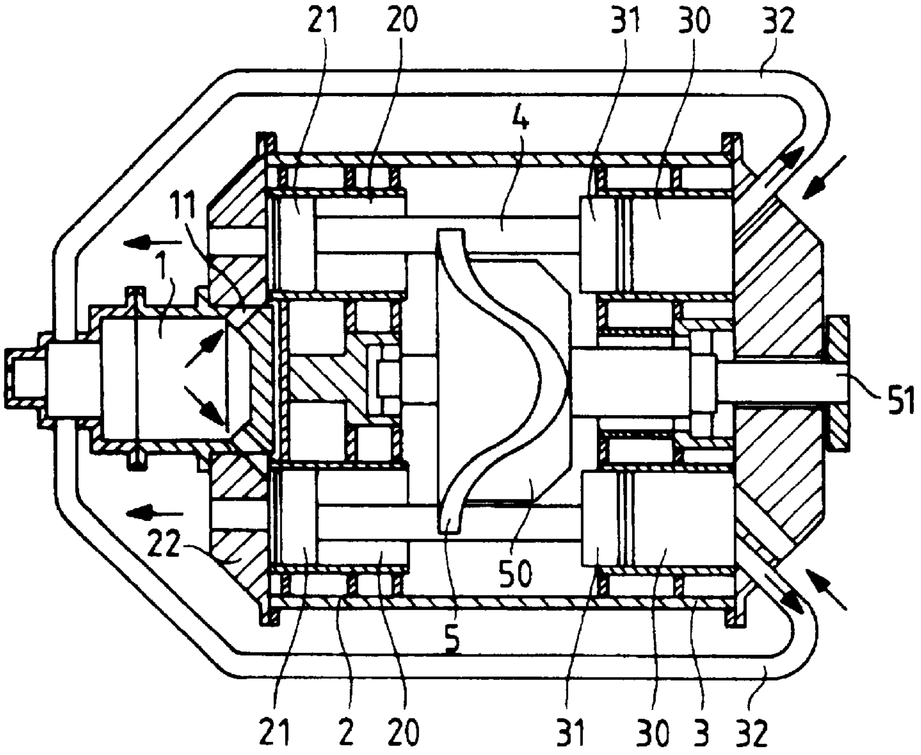

The invention concerns a continuous-combustion piston engine in which working medium flowing out of a combustion chamber is successively fed to at least two cylinders.

As is known, such an engine consists of a stationary housing in which a cylinder block rotates with axially-parallel cylinders arranged in a circle. The pistons act via piston rods on an angled crank disc that rotates synchronously with the cylinder block and whose fixed axis is angled in relation to the engine shaft.

A single combustion chamber common to all cylinders is in a stationary cylinder head and is connected to control surface of the cylinder head by an inlet and outlet hole that the rotating cylinders pass by. There is a seal between the rotating cylinder block and the stationary cylinder head.

During a single rotation of the engine shaft that is fixed to the cylinder block, each cylinder is given fresh air at the bottom piston dead center, and the air is slightly compressed during further rotation by the piston motion until it is fed into the combustion chamber close to the upper dead center and is ignited with fuel injected at that site. The piston movement follows from the angled position of the crank disc.

After passing the upper dead center, the cylinder receives combustion gas from the combustion chamber that then expands until an outlet common to all cylinders opens right before the upper dead center. Then a charge cycle occurs in a two-cycle process. The fuel is continuously fed to the combustion chamber through an injection nozzle so that the combustion remains uninterrupted. Electrical ignition only occurs when the engine is started.

Such a piston engine experiences relatively high mechanical wear from the seal of the cylinder block and the centrifugal force of the pistons.

The problem of the present invention is to present a continuous-combustion piston engine that is subject to far less wear.

As a solution, the invention suggests a continuous-combustion piston engine in which working medium flowing out of a combustion chamber is successively fed to at least two cylinders. Each of the cylinders is stationary in relationship to the combustion chamber and has an inlet. Controls are provided that successively connect and separate the inlet with the combustion chamber.

Since the cylinders are stationary in relationship to the combustion chamber, there is no movement between the cylinder block and cylinder head or combustion chamber. Hence additional measures are not required to provide a seal between the cylinder head and cylinder block, and technologies used for conventional engines can be used.

Mechanical losses can be also be reduced by moving the output shaft in relation to the cylinder block. It is possible to fix the cylinder, cylinder head and combustion chamber to prevent mechanical loss from the centrifugal force of the pistons. Of course, this solution is advantageous in and of itself.

To realize this motion, the output shaft can e.g. have a swash plate that is connected via piston rods with the pistons working in the cylinders. The term “swash plate” describes a wobble body rotatably mounted to a knee section of the output shaft that has radially external articulation points for the piston rods. The output shaft or knee section of the output shaft can only follow a change in the angle of the wobble body from the piston motion due to rotation which converts the linear piston movement into a rotary movement.

Likewise, an output shaft can be provided that has a cam disc along which pistons run that work in the cylinders. Such a cam disc arrangement is extraordinarily effective.

On the other hand, any other arrangement that can convert a linear piston motion into a rotary motion can be advantageously used.

A particularly favorable flow of force results when the combustion chamber is coaxial with the output shaft. This is particularly advantageous when a swash plate or cam disc is used, and this favorable flow of force is also advantageous with other output shafts driven by pistons. This arrangement allows in particular a single-flow drive of generic piston engines that makes access to the combustion chamber easier, e.g. for service purposes.

A piston engine according to the invention runs comparatively in a circle if the cylinders are symmetrical to the combustion chamber. This allows the flow of working medium from the combustion chamber to be evenly distributed to the cylinders.

While generic piston engines are single flow, i.e., the output drive is only to one side, the stationary cylinders allow generic piston engines to be dual flow to permit an auxiliary drive such as for an oil pump, fuel pump and/or distributor pump, even next to the combustion chamber. It is also possible in particular to place a corresponding output drive between the stationary cylinders so that no additional installation area is necessary.

At least one inlet of a cylinder can be opened or closed to the combustion chamber via at least one slide valve. This ensures that when the piston returns, the working medium is specifically conveyed through an outlet out of the cylinder. In addition, the inlet can be sealed before the corresponding piston reaches its dead center or the working medium has completely filled the cylinder. The energy in the working medium can hence be better exploited since otherwise some of the working medium flowing through the inlet cannot contribute to the overall work, i.e., to driving the piston.

Such an arrangement is particularly advantageous when there is a flow channel from the combustion chamber to each inlet through which working medium could otherwise flow at any time into the cylinder. This would prevent the piston from returning after the working medium expands.

The slide valves are advantageously controlled so that they move synchronized to the rotation of the engine or the position of the piston. Hence the slide discs can be opened at specific times and working medium can enter the cylinders. The flow channel can also be closed so that the expanded working medium can flow out unhindered.

Of course, controlling the slide valves that open and close the feed channels can also be advantageous independent of the other features of a continuous-combustion piston engine.

It is also conceivable to equip the combustion chambers with a combustion chamber floor that has at least one feed channel. The combustion chamber floor with the feed chamber is shifted so that the feed channel is successively directed to one inlet. This also allows the targeted distribution of the hot working medium to the individual cylinders.

In particular when the cylinders are arranged symmetrically around the combustion chamber, it can suffice to rotate the combustion chamber floor synchronized with the rotary speed of the engine.

Of course such a rotating combustion chamber floor is advantageous independent of the other features of the continuous-combustion piston engine; a rotating combustion chamber floor looses much less heat for construction reasons at the transition of the combustion chamber to the cylinder, and the piston engine is much simpler to construct.

While a slide valve as described above is not essential for the last-cited arrangement, it can have cumulative application.

In particular, the slide valve can be a cylindrical sleeve around the piston in the cylinder that has an opening corresponding to the inlet, and the opening mates with the inlet synchronized with the engine rotation.

Such an arrangement is extremely reliable and comparatively easy to construct since the sleeve is exactly symmetrical to the cylinder and piston. This sleeve can be mounted very securely and can also be easily synchronized with the engine rotation, e.g. by levers or gears.

The sleeve can be mounted lubricated to ensure frictionless movement.

The sleeve can by easily mated with the inlet synchronized with the engine rotation when the sleeve rotates around the cylinder axis. This can occur simply by rotation, or an oscillating motion is also possible.

This sleeve motion also distributes the cited lubricant. If the sleeve also executes an axial motion in relation to the cylinder, i.e., an axial stroke, the lubricant can also be distributed parallel to the cylinder axis.

Such an axial stroke can e.g. be provided by piston friction when the piston lies directly on the sleeve. If the piston friction is insufficient, the axial stroke can also be forced. This is possible by levers or gears, or a gas-controlled axial stroke that operates from a pressure differential can also be used.

A Burt-McCullumn slide valve can e.g. be used as the sleeve.

In particular, the sleeve can also move periodically with the period corresponding to a fraction of the motor speed. This is e.g. possible when the sleeve has several identical openings. Such a measure reduces material stress and lowers the need for lubrication. In particular, the sleeve can be driven twice as slow as the engine.

The same holds true for the motion of a combustion chamber floor, especially when the combustion chamber floor has a correspondingly high number of feed channels.

Depending on the selected construction, the distance between the combustion chamber and cylinder can be relatively small. This can cause the cylinder to be exposed to high temperatures. In particular, this can affect the above-described sleeve serving as a means of control. For example, the sleeve can be mounted in a bush by which the sleeve is stabilized, especially when it directly contacts the corresponding piston. A lubricant such as oil is provided between the bush and sleeve. If the sleeve or bush is heated too much, the lubricant can be destroyed.

To avoid overheating, a heat shield can be provided between the combustion chamber and each cylinder. According to the invention, such a heat shield can be between each combustion chamber and a cylinder assembly that is thermally separate from the combustion chamber and the cylinder assembly. This separation can e.g. be provided by an air gap, a transition of material, or another thermal block. In particular, it is also conceivable for the heat shield to be connected to the combustion chamber and/or the cylinder at another, more distant site, and the path that must be traveled forms a sufficient temperature block.

The heat shield can be advantageously placed in front of the inlet so that the heat shield can also cover a slide valve or a sleeve that closes the inlet. The temperature of the slide valve or sleeve can be kept accordingly low so that e.g. the lubricant or oil film necessary for these components is not destroyed.

When the inlet is open, the heat shield is removed so that the working medium can flow through the inlet into the cylinder at a high temperature. Any residual lubricant is burned nearly pollutant-free at the high temperature.

The presented arrangement ensures that a lubricant film is retained, and the residual lubricant in the cylinder is burned nearly pollutant-free.

A piston engine with such an arrangement accordingly provides a separation of functions. While the heat shield reflects direct heat, the slide valve or sleeve sufficiently seals the cylinder both to the exterior and interior. Such a division of tasks by providing the heat shield between a cylinder component and the combustion chamber is also advantageous independent of the additional features of the piston engine with continual combustion.

To prevent the edge of the slide valve or the sleeve opening from burning away, it is advantageous for the sleeve or slide valve and the heat shield to move essentially in the same direction when the inlet is opened and closed. It is in particular conceivable for the heat shield to move in the opposite direction to the sleeve around the combustion chamber. This parallel movement can ensure that the heat shield sufficiently covers the opening edge or slide valve edge. Of course, apart from this, the movements of the heat shield and slide valve or sleeve do not have to be coordinated. For example, the sleeve can oscillate and the heat shield can rotate.

If, as described above, the combustion chamber floor is shifted or rotated, the heat shield can be shifted and rotated along with it. On the other hand, the heat shield can also be fixed stationary around the inlet. Slight shifting motions are also conceivable that only follow the rotation of the combustion chamber floor when the feed channel reaches a corresponding inlet.

Of course, the heat shield can also rotate at a slower speed than the engine speed.

To optimize the engine output, means can be provided to move the piston dead center in reference to a position of the control or slide valve, sleeve or heat shield.

Likewise, the movements of these components can be shifted in relation to each other. It is also possible to take into account the flow or speeds of the individual components and their different effects at different speeds or under different loads. This means of control can also vary depending on the load or speed in reference to the dead center of the piston.

At least one of the cylinders can have an outlet valve. This largely prevents unnecessarily unburned carbons entering the exhaust from existing lubricants or oils when the uncompressed working medium is released as an exhaust. Any remaining lubricants are reliably burned given the high temperature of the entering working medium.

The use of valves to control the outlet of the working medium is also independent of all the other features of the continuous-combustion piston engine to prevent the exit of lubricant or oil and minimize the emitted pollutants. Slide valves or cylinder movement can be used to control prior art piston engines with continuous combustion that require a seal that is contacted by lubricants when expanded working medium exits. This can also be avoided by using an outlet valve for these piston engines with continuous combustion.

In the present context, the term valve describes each shut-off organ where a sealing surface is removed from a seat. With such an arrangement, sealant or lubricant does not have to be used which is an advantage according to the invention. Hence the use of valves is a complete change from the sealing mechanisms used to date for piston engines with continuous combustion. Of course other initial controls, especially other slide valves or openings in the sleeve are conceivable taking into account slight amounts of pollutants.

Such solutions can in particular be used when other measures can prevent the exhaust from contacting unburned lubricants, or the pollutants are subsequently eliminated.

Any suitable valve drives can be used as a valve drive. The valves can e.g. be driven hydraulically. A hydraulic pump can be used that e.g. is controlled via a cam arrangement. It is also possible to control the valves electrically or magnetically. With these two options, the valves can be controlled fairly easily depending on the load or speed of the engine. In particular, it is also conceivable to measure the valve stroke, e.g. by measuring pressure or using an electric coil. The measured valve stroke can also influence the control of the valves.

The valve drive can also be a cam disc or swash plate. Such a disc can be moved by a separate drive synchronously with the engine. It is also conceivable to drive the cam arrangement or the like directly by the slide valve or sleeve.

Likewise, tappets can be used as a valve drive, cumulatively as well.

Mushroom and ball valves (including ceramic ones) can also be used.

In contrast to all prior art piston engines with continuous combustion, an inlet and/or outlet valve can also be provided in the compressor. Such valves provide relatively high compression with a relatively simple design in contrast to prior art compressors in which comparatively involved seals are necessary due to the very large sealing surface.

In principle, those valves described in relation to the cylinder outlet valve can also be used. Corresponding valve drives are also possible. Of course, these valve drives can be shifted corresponding to the load and engine speed in relation to the dead center of the corresponding compressor if it increases the engine output.

In addition, it is also possible to design the inlet and outlet valves to be passive depending on the requirements which saves costs.

For example, a compressor can have an inlet valve that has a valve cover on the compressor that is pulled by a spring toward a valve seat. Such an arrangement provides a comparatively simple design where the inlet valve can be opened by compressor vacuum so that a medium to be compressed flows in, and the valve provides compression as soon as the inflow stops. During compression, the inlet valve is pressed against the valve seat by the arising pressure to reinforce the sealing effect.

To prevent the inlet valve from contacting a stop too strongly when it opens, a spring can be effective between the valve and stop. It is in particular possible to use the spring that draws the valve against the valve seat. The latter arrangement is comparatively easy to construct since two functions are accomplished by the same component.

A ball valve can be used as the outlet valve for the compressor. Since only a small volume is moved through the outlet, the outlet valve only travels a short path. A ball valve as a check valve provides a sufficient seal and a sufficiently high flow of the medium to be compressed. A spring is not absolutely necessary due to the short paths.

The continuous-combustion piston engine can have an intake chamber that is connected to at least one compressor, and it is on the end of the engine facing away from the combustion chamber. The described inlet valves can end directly in the intake chamber. Such an arrangement provides a simple engine design despite the stationary cylinder, and the compressor can be supplied with the medium to be compressed in a controllable manner. In particular, a common access to all the compressors can be created so that the medium, e.g. air, can be easily subjected to a common pretreatment such as filtering. Such an arrangement is especially suitable for piston engines with continuous combustion in which the compressors and operating cylinders are separate from each other on opposing ends of the engine.

The invention also proposes a separate compressor cylinder with a compressor piston that is connected via a compressor connecting rod to a connecting rod of a cylinder piston running in a cylinder. In contrast to all prior art piston engines with continuous combustion, the invention proposes separating the compression cylinder and working cylinder. The advantage of such an arrangement is that the respective cylinders can be specially designed corresponding to their task. The overall degree of effectiveness can thereby be increased.

The working connecting rod and compressor connecting rod can be rigidly connected with each other so that work accomplished by the working connecting rod can be directly converted to compression. This increases compression effectiveness. The working connecting rod and compressor connecting rod can be designed as a single connecting rod so that force applied by the working piston can be directly conveyed in a straight line to the compressor. The piston rod can be designed in two parts to make assembly easier, and these two parts are then rigidly connected to each other during installation.

The piston rods can have two rollers that grasp a cam disc of an output shaft. Such an arrangement has a straight connecting rod that connects the working piston and the compressor piston, and a cam disc that is driven by the connecting rod. This arrangement is also advantageous independent of the other features of the continuous-combustion piston engine. Such an arrangement is distinguished by a high degree of effectiveness.

It is also conceivable to dispense with the rollers or roller-bearing-mounted rollers if the friction between the connecting rod and cam disc can be kept within reasonable limits. In particular, other suitable measures are conceivable.

The use of a cam disc for a continuous-combustion piston engine can also be advantageous even when there is no continuous connecting rod. In particular, such a cam disc can be used for arrangements in which working cylinders and compression cylinders are not in a linear arrangement.

The connecting rods can be prevented from rotating on their longitudinal axis fairly easily when at east one of the rollers has a shoulder and/or a guide disc that radially contacts the outside of the cam disc.

By suitably selecting the number of cylinders, a continuous-combustion piston engine can be operated free of translatory force that arises from piston movement. If several pistons are operated in the same direction and they are symmetrical with each other, torque can be completely eliminated. It is therefore easy to operate such continuous-combustion multiphase piston engines nearly without vibration.

Single-phase piston engines with continuous combustion with no torque adjustment are; however, subject to torque that cause piston engines to wobble. To counter such wobbling, the piston engines have to be balanced. Classic procedures such as balancing the output shaft produce comparatively large undesirable bending stress on the output shaft.

For this reason, the invention suggests balancing single-phase continuous-combustion piston engines with the gear elements already between the working pistons and output shaft. A cam disc or swash plate is useful for this. Practical experiments have shown, however, that adding weights is not necessarily enough to sufficiently counter unbalancing forces. For this reason, the invention proposes designing a continuous-combustion piston engine with gear elements between the piston and output shaft so that their unbalance is compensated by the unbalance of the pistons. These gear elements can weigh more or be thicker than is required for stability to operate the piston engine. In particular, a cam disc can e.g. be designed wide enough for its balancing force to compensate the unbalance force of the piston arrangement. The smooth running obtained with the latter arrangement is at the cost of a longer design for the entire engine.

The present invention hence claims gear elements between the piston and output shaft that are thicker or heavier than is necessary for stability including the set tolerances whose balance essentially compensates the. unbalance of the piston arrangement in continuous-combustion piston engines. Slight residual unbalance can be compensated by additional weight on the gear elements like a cam disc or even the output shaft.

Of course, gear elements designed in this manner can be advantageous for the smooth running of the engine independent of the other features of the continuous-combustion piston engine. In particular, such measures can be used for multi-phase continuous-combustion piston engines to reduce the internal stress on the gear elements that connect the pistons with each other and with the output shaft.

To provide a very even lubricant supply with a simple design for all necessary components of the continuous-combustion piston engine, an oil supply channel can be provided in and coaxial to the central output shaft that includes oil distributors radiating outward at corresponding sites. The centrifugal force arising from the operation of the engine radially conveys the oil from the oil distributors that can be designed as fine holes. The oil distributors are at suitable locations for the oil or lubricant to reach the desired places in the engine. In addition, the oil feed channel has at least one radial feed that e.g. is supplied with oil from an annular channel under pressure. The pressurized lubricant is hence pressed into the radial oil feed and reaches the oil feed channel coaxial to the output shaft. The lubricant pressure overcomes the centrifugal force in the annular channel. The necessary pressure can be maintained by any prior art measure such as an oil pump. Such an oil or lubricant supply is independent of the other features of the continuous-combustion piston engine according to the invention since it ensures a precisely-dosed lubricant distribution with a simple design. The dosing is done in particular using a suitable oil distributor or by means of the oil distributor diameter.

The continuous-combustion piston engine can have a coolant stream. that directly contacts a guide in a cylinder. According to the invention, such guides are particularly necessary for cooling. In particular, the coolant stream can contact a guide for a slide valve of a feed channel. Such guides particularly need sufficient lubrication. On the other hand, such slide valves as described above are subjected to high temperatures. This stress tends to destroy the lubricant film. This destruction can be effectively countered if the corresponding slide valve guide directly contacts the coolant stream.

This is particularly true for bushes for cylindrical sleeves surrounding pistons that serve as slide valves for opening and closing a feed channel. Such a bush can directly contact the coolant stream.

Of course, such a direct contact between the coolant stream and the guide enhances the operation of a continuous-combustion piston engine independent of the other features.

To counter the temperatures arising in the direct environment of a feed channel, a coolant stream can be supplied rapidly by small holes that are directly next to the feed channel. The hole diameter and the flow rate are set to control the arising pressure. Such a measure can also be used for other piston engines with continuous combustion close to a feed channel. In addition, such small holes can also be placed at other sites directly next to the combustion chamber to control the temperatures arising in the combustion chamber that can exceed 2,400° C.

To prevent strong temperature gradients in the continuous-combustion piston engine, a coolant stream can ensure a temperature balance between. different components. This ensures that the lubricant in the continuous-combustion piston engine is equally effective for all operating parts. For example, the coolant stream can be sent directly from a cylinder to a compressor to balance the temperature between the two components. On the other hand, two parallel coolant streams can be provided, one for the cylinder block and the other for the compressor block, and the coolant streams are sequential.

In contrast to prior art continuous-combustion piston engines in which each cylinder is guided past an exhaust outlet, continuous-combustion piston engines according to the invention with stationary cylinders have an outlet for each cylinder that is connected to the exhaust manifold which can have a common exhaust connection. Such an arrangement ensures a uniform exhaust outflow which helps the engine run smooth. If this is insufficient, two outlets connected via the manifold can also be directly connected to each other via a pressure equalizer. This provides outlets that have a particularly long path to the common manifold a uniform exhaust flow.

In addition, the common exhaust connection ensures that the exhaust can be fed to a heat exchanger that transmits energy of the exhaust or of the fluid leaving the respective outlet to the fluid supplied to the combustion chamber. Such an arrangement is particularly suitable for continuous-combustion piston engines in which a separate compressor compresses a fluid and feeds it to the combustion chamber. The heat exchanger is between the compressor and the combustion chamber. Such an arrangement is also advantageous for continuous-combustion pistons engines in which the working cylinder and compressor are formed by the same component. In particular, such a heat exchanger can be advantageously used for prior art continuous-combustion piston engines. Such a heat exchanger unexpectedly increases the effectiveness of the engine since compression and expansion represent two distinct process steps in which the working medium intermediately flows through the external combustion chamber.

A Bernard heat exchanger can e.g. be used as the heat exchanger. In particular, it is possible for the compressed air side to be coiled. Packing can be placed in the compressed air side to displace the air.

Since dealing with comparatively high temperatures in the combustion chamber is one of the central thermodynamic problems of continuous-combustion piston engines, the supplied compressed fluid can be provided around the combustion chamber as a heat exchanger for heat insulation.

To help control the temperatures in the combustion chamber, the flame area in the combustion chamber can be provided with a ceramic lining.

The stability of the ceramic lining can be increased by applying stress to it, at least during operation. The stress is selected to prevent tensile force from arising. The ceramic lining is preferably under a bias stress before start up. The bias stress can run in an axial direction, i.e., along the flame area wall. This can e.g. be done with a steel bracket.

The ceramic lining can also be under a bias stress that extends radially inward into the flame area. This can be accomplished by inward-facing support such as stamps or a suitably cut thread. The radial supports or thread can also serve as a channel for coolant or fluid.

The ceramic lining can also have cooling ribs that abut a corresponding wall to the outside and provide a suitable bias stress. In addition, the distance between the ceramic lining and the additional housing for the flame area serves as thermal insulation. Hence the spacers will be comparatively small to minimize thermal bridges.

Such a ceramic lining is also independent of the other features of the above-described continuous-combustion piston engine.

In addition, the combustion chamber of a flame area can have holes in a flame area wall through which a fluid can be guided into the flame area. Such an arrangement helps control the ignition in the flame chamber. Accordingly, fluid can be fed to deflect or lengthen the actual flame in a desired manner.

It is also possible to have the fluid flow along the wall in the area of a backflow that runs in the opposite direction of the actual flame. Such a fluid backflow can insulate the combustion chamber to the outside, for small combustion chambers. The fluid can e.g. come from the compressor. The fluid supplied in this manner can also participate in combustion while it flows through the flame area, especially when it stops going in the backflow direction and is accelerated in the direction of the flame.

To control the flame in a suitable manner, the ignition chamber can be supplied fuel via an injection pump that is controlled with a lambda probe. Such a control loop allows a continuous-combustion piston engine to be reliably operated independent of its other features. The lambda probe is advantageously behind at least one cylinder on the outlet side. In particular, the lambda probe can be in an exhaust manifold or exhaust connection. The lambda probe is advantageously controlled within a specific load range, especially at full load. $\lambda$ is regulated at values $\geqq 1$. This means that the exhaust does not contain too much or too little air or an excess of the medium provided by the compressor, i.e., the injected fuel can be sufficiently burned.

It is also possible to control the injection pump by temperature measurement. The required temperature measurement can also be made at the outlet behind a cylinder. The temperature is controlled at least within a certain load (at least in neutral) at ca 1000° C. or an idling temperature. These temperatures ensure that the flame in the combustion chamber continues without outside means such as a spark plug. Spark plugs are only used to start the engine.

The control loop advantageously includes the injection pump, lambda probe and a thermometer. The thermometer is used in idle and the lambda probe is used at full load. In between, the control is provided by a corresponding functional link of both measured values. The temperature and/or lambda are set as manipulated variables depending on the desired torque.

Figure 2:
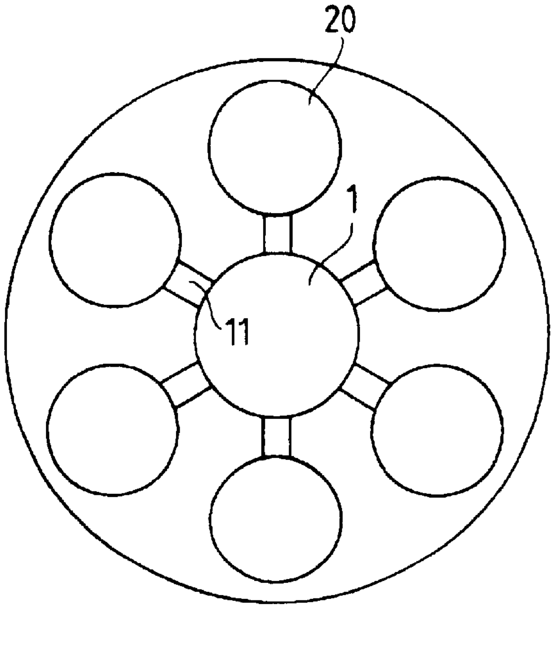
Figure 3:
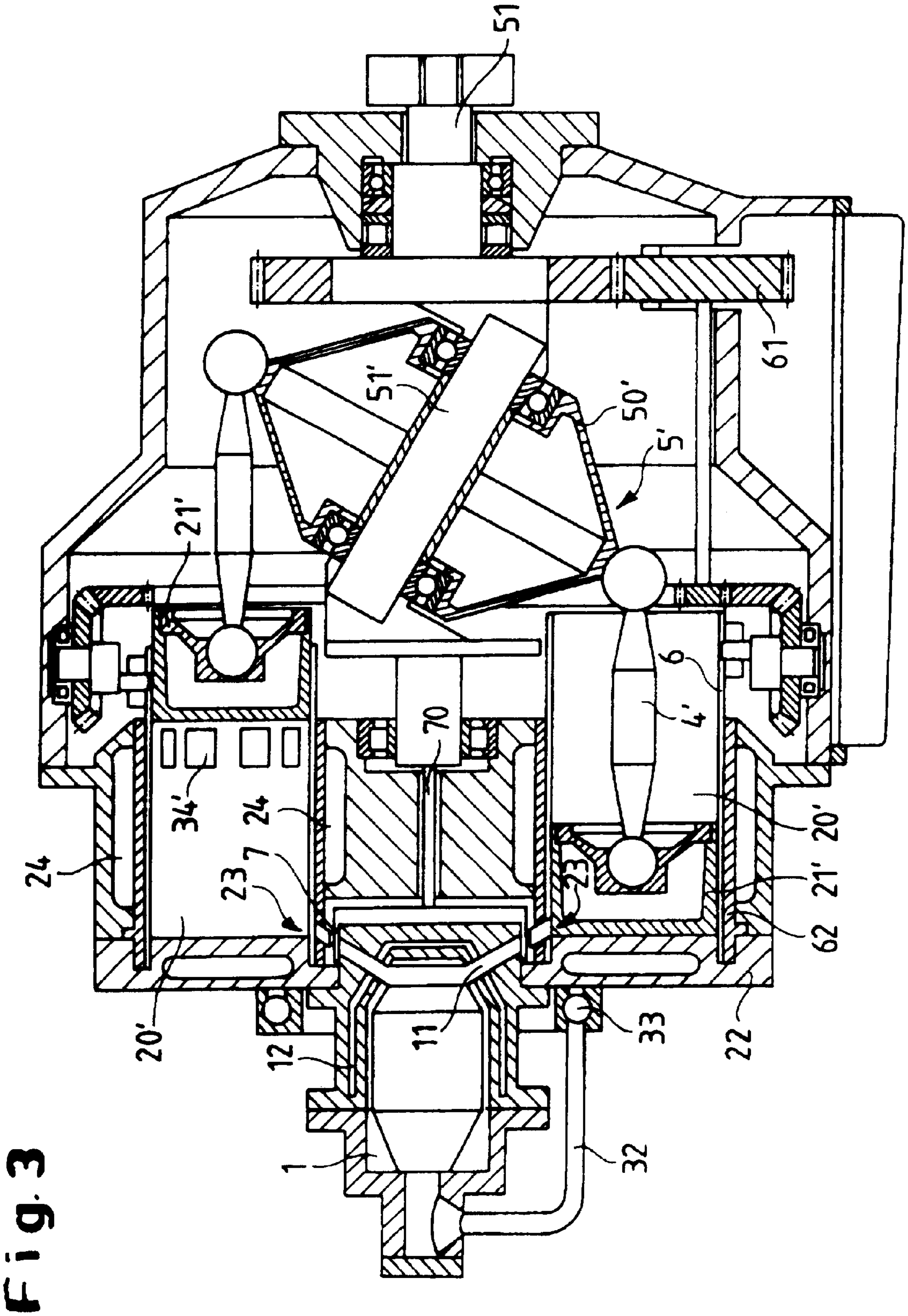
Figure 4:
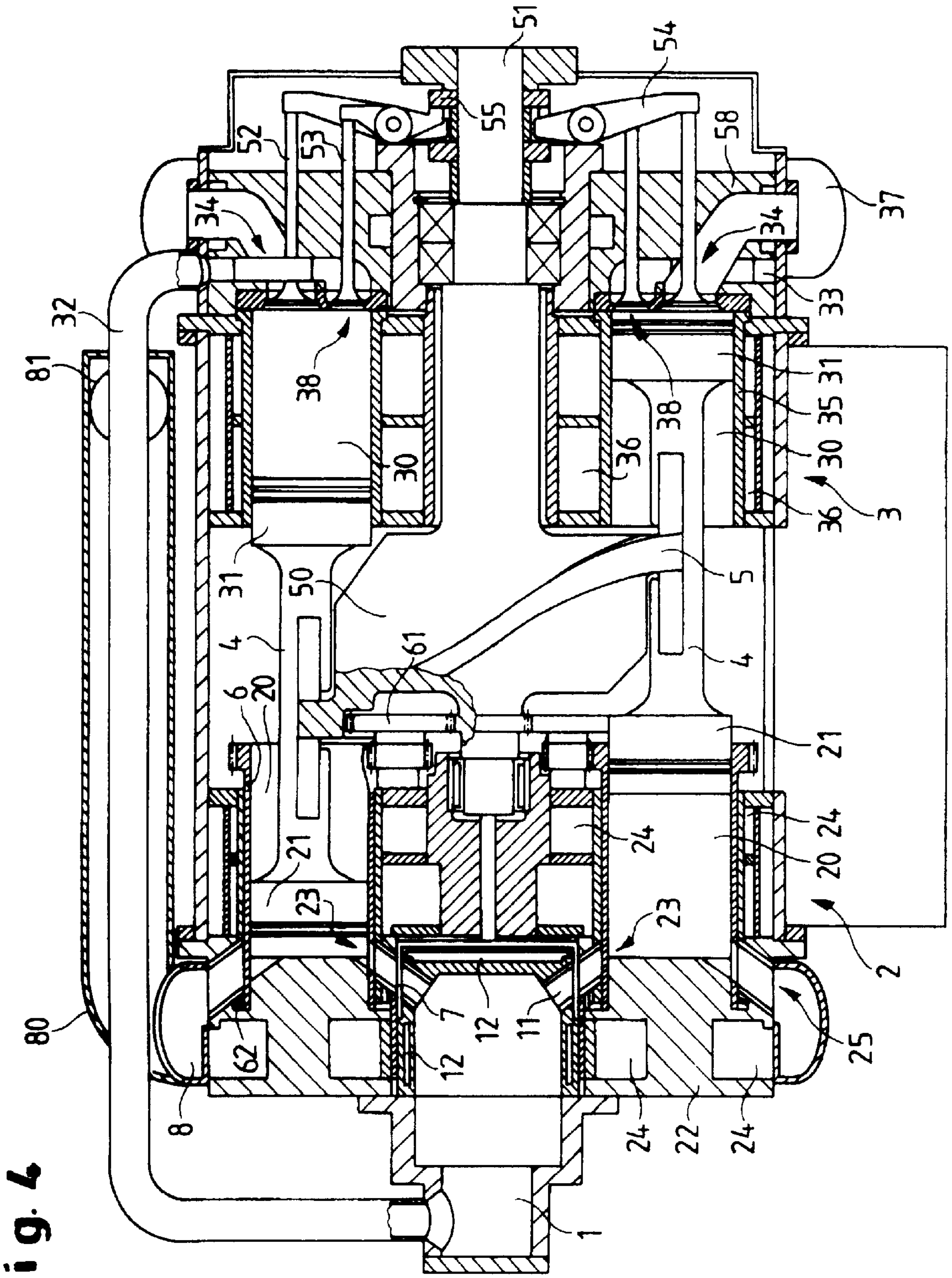
Figure 5:
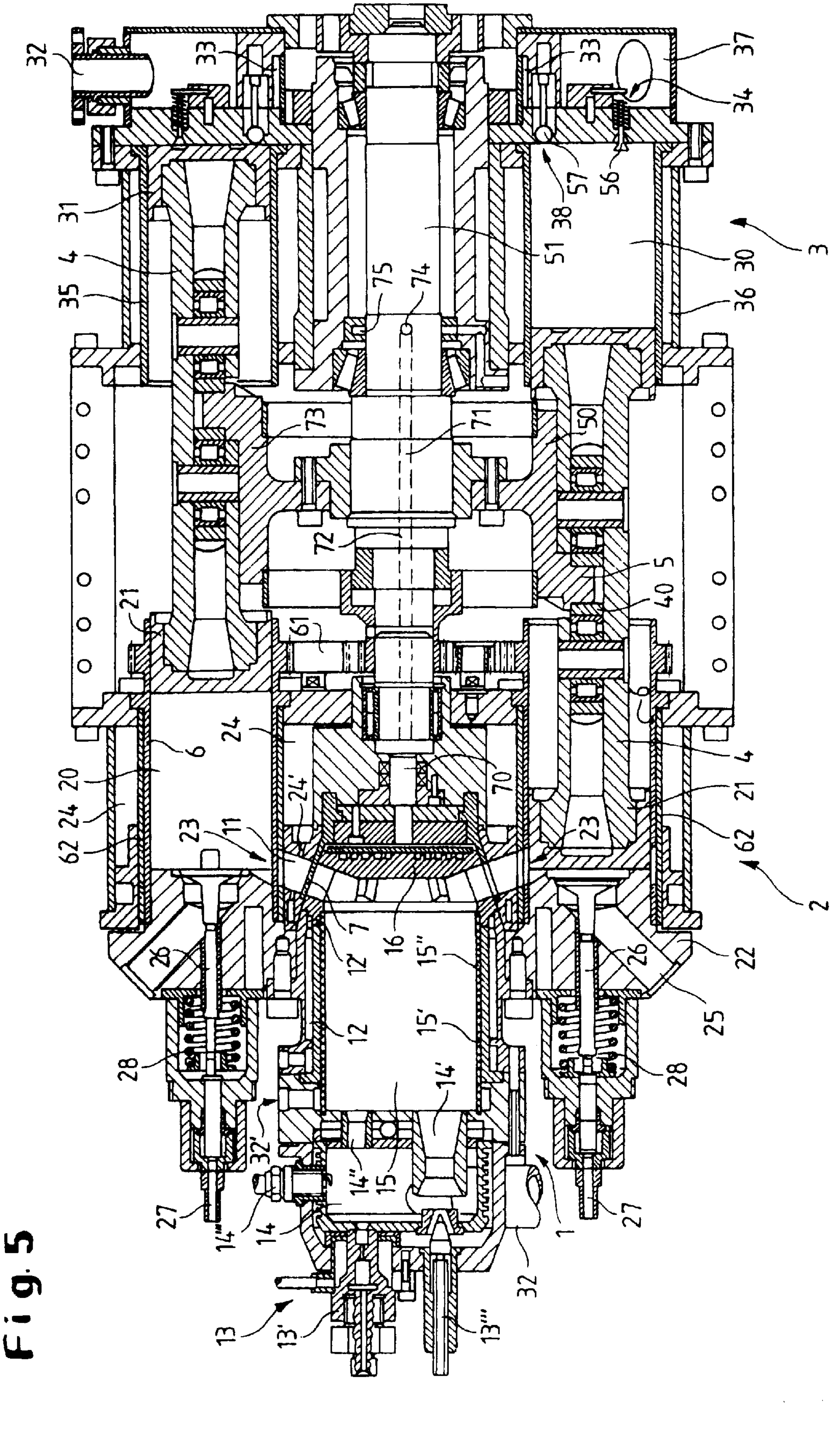
Figure 6:
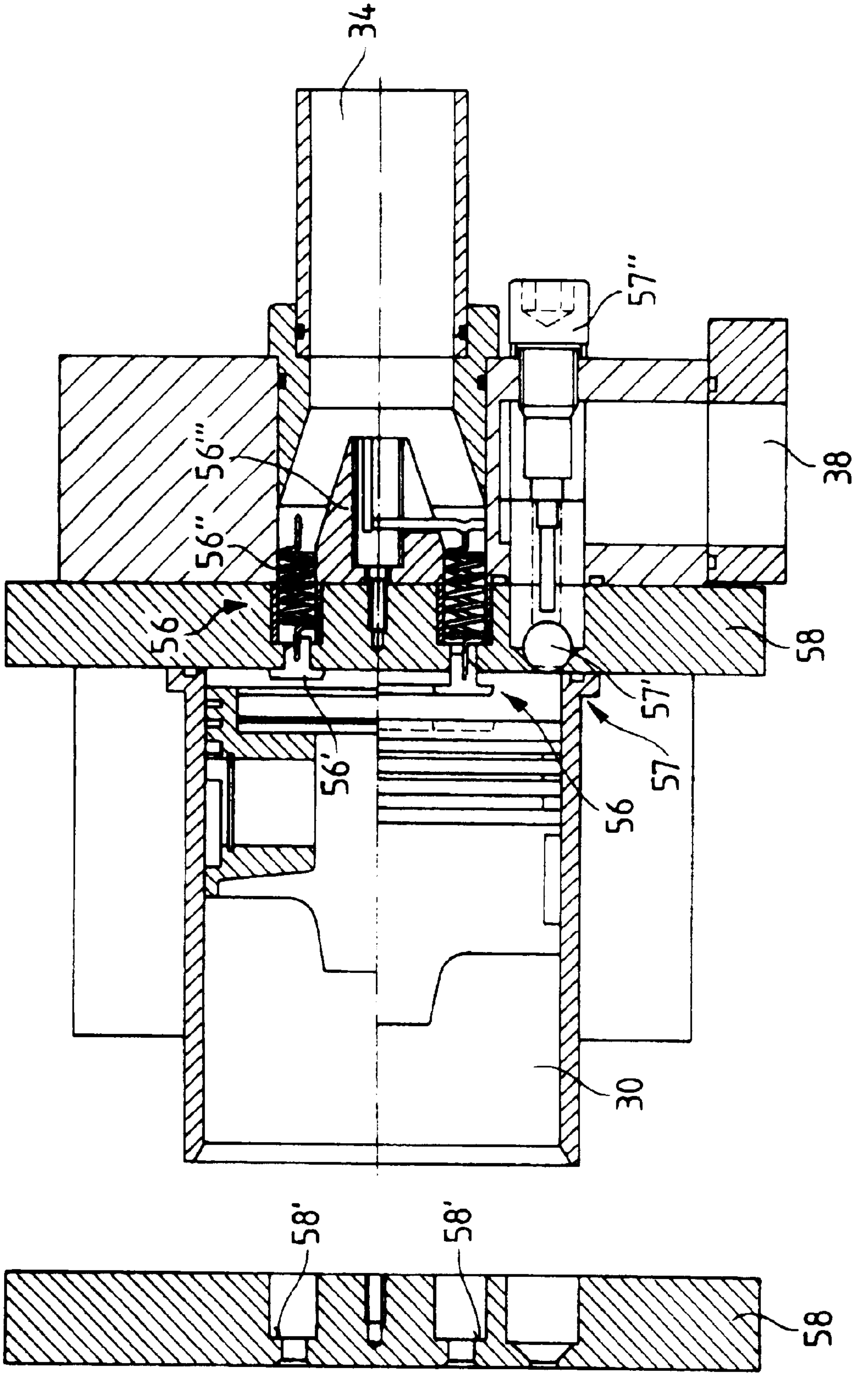
Figure 7:
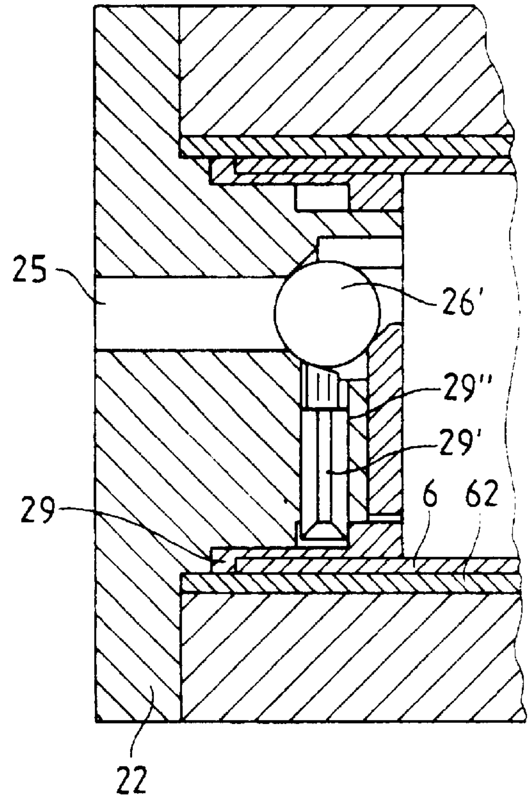
Figure 8:
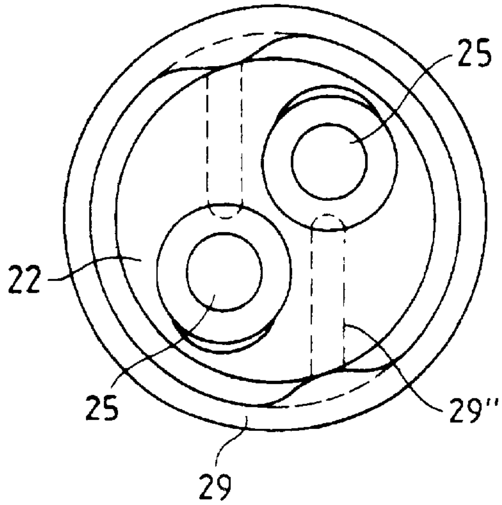
Figure 9:
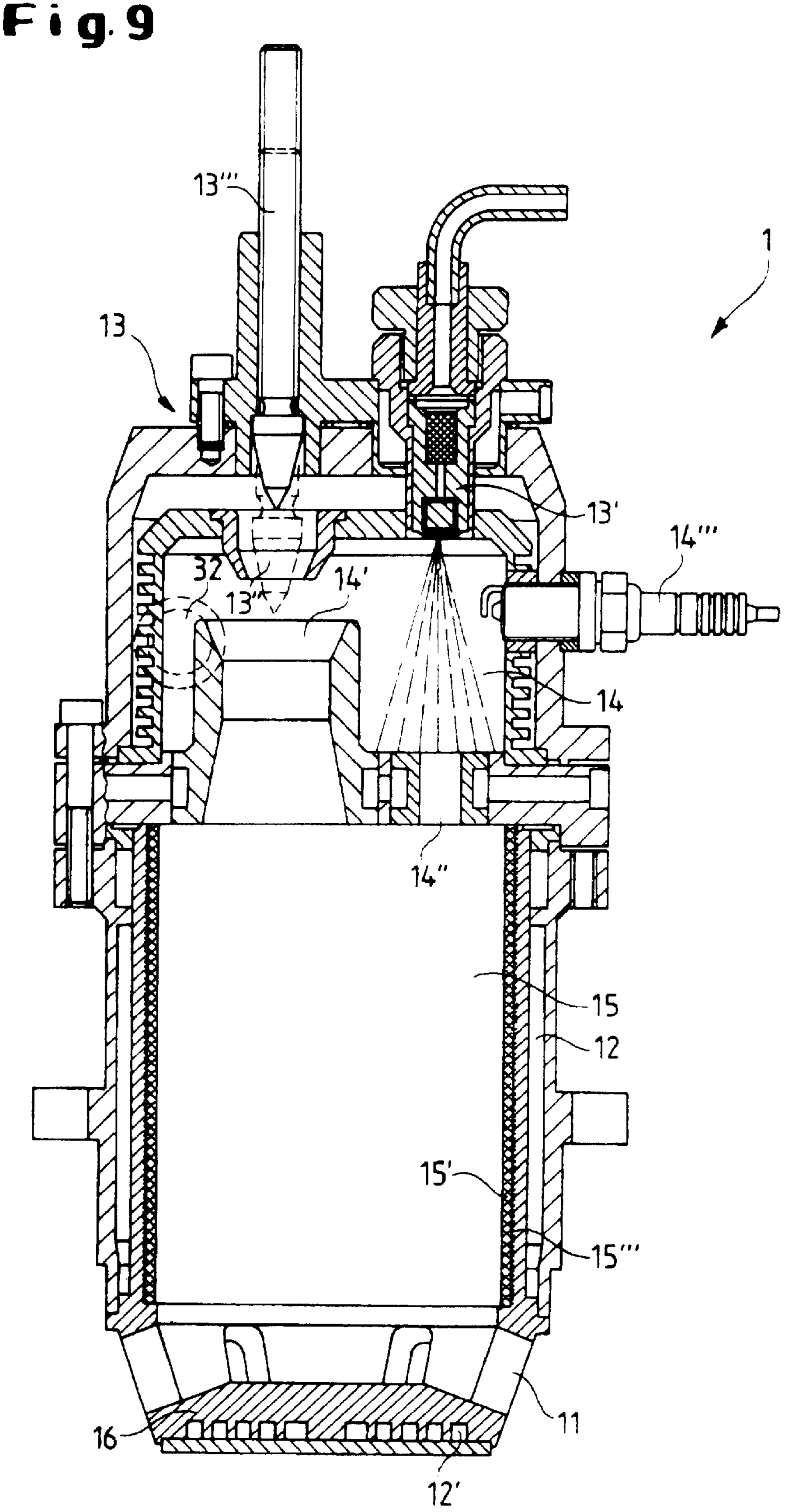

Other advantages, goals and properties of the present invention will be described with reference to. the following drawing in which examples of continuous-combustion piston engines are shown. Shown in the drawings are:

FIG. 1 A schematic section of a two-phase 4-stroke continuous-combustion piston engine in which the working cylinders and compressor are separate, FIG. 2 A schematic cross-section of the piston engine from FIG. 1 that shows the coaxial arrangement of the cylinders around combustion chamber of the piston engine, FIG. 3 A schematic section of a two-stroke continuous-combustion piston engine in which a cylinder functions as a working cylinder and compression cylinder, FIG. 4 A schematic section of a single-phase, 4-stroke continuous-combustion piston engine in which the working cylinders and compressor are separate, FIG. 5 A schematic section of another single-phase, 4-stroke continuous-combustion piston engine in which the working cylinders and compressor are separate, FIG. 6 A detailed view of a compressor, FIG. 7 A detailed view of a cylinder head, FIG. 8 A schematic top view of the cylinder head from FIG. 7, and FIG. 9 A detailed section of a combustion chamber.

The schematically portrayed piston engine in FIGS. 1 and 2 comprises a combustion chamber 1 from which a working medium enters cylinders 20 (numbered as an example) through feed channels 11 (numbered as an example) . The working medium expands there and drives the pistons 21.

The pistons 21 are connected to connecting rods 4 that are linked to compressor cylinders 30 (numbered as an example) of reciprocating compressor pistons 31 (numbered as an example). In addition, a common cam disc 5 that is connected to the output shaft 51 via a spacer 50 grips the connecting rods 4.

When the working medium expands, the pistons 21 and the connecting rod 4 drive the cam disc 5 and the compressor piston 31. Via the rotating cam disc 5, working pistons 21 that contain the expanded working medium are moved toward a cylinder head 22. The associated compressor pistons 31 are likewise moved. These intake fluid (air in the present exemplary embodiment—indicated by arrows).

While the working medium performs work, the air is compressed in the compressors 30. The compressed air is fed via the feed lines 32 to the combustion chamber 1. It is used there at least partially to ignite an injected fuel.

As can be seen in FIGS. 1 and 2, the cylinders 20 are symmetrical to a central engine axis. In addition, two opposing connecting rods 4 move in the same direction so that the engine runs essentially free of vibration.

For the engine to rotate, the piston engine, like the engines in the other exemplary embodiments, has controls that open and close the feed channels 11 corresponding to the motor speed.

The piston engine in FIG. 3 essentially corresponds to the above-described piston engine. However, the cylinders 20' and their pistons 21' fulfill both the working function and compressing function. In addition, a swash plate 5' is between the pistons and output shaft 51 and not a cam disc. The pistons 21' are connected to the swash plate 5' by connecting rods 4' via corresponding articulations. The swash plate 5' is mounted to a knuckle shaft 51' of the output shaft 51. When the work medium expands in one of the cylinders 20', the swash plate 5' inclination changes that the knuckle shaft 51' can only follow with a movement of the output shaft 51. When the swash plate 5' changes its inclination, the opposing piston 21' moves against the cylinder head 22. Air that enters via inlets 34' into the cylinder 20' is compressed and forced into a pressure chamber 33 that is designed as a ring line. The compressed air enters the combustion chamber 1 via the line 32. The working medium passes from the combustion chamber 1 via feed channel 11 into the cylinder 20'.

Controls ensure that the working medium enter the desired cylinder 20'. The controls consist of a sleeve 6 (numbered as an example) that is moved via a gear arrangement 61 synchronized with the engine rotation. As can be seen, the sleeve moves both parallel to its lengthwise axis and around its lengthwise axis. This serves to distribute the lubricant between the sleeve 6 and a bush 62 (numbered as an example) bearing the sleeve.

The sleeve 6 serves as a slide valve that opens and closes the inlet 23 of each cylinder 20' synchronous to the motor rotation. The sleeve 6 also has a corresponding opening.

To prevent unnecessary load on the sleeve 6, the bearing bush 62 and the lubricant film between the two, each bush 62 is cooled directly with water (numbered as an example with 24). For the same reason, a heat shield 7 is between the combustion chamber 1 and the inlet side of each cylinder 20'. The heat shield 7 is connected via a shaft 70 to the output shaft 51 and hence rotates synchronously with it. In addition, the heat shield has openings (not numbered) that are arranged so that they release the feed channel 11 in a desired manner so that the working medium enters the corresponding cylinder 20' through the inlet 23 opened at the same time.

In addition, the combustion chamber 1 is water-cooled by means of channels 12, and the areas of the combustion chamber 1 outside of the water cooling also serve as a heat shield.

The piston engine in FIG. 4 essentially corresponds to the one in FIGS. 1 and 2, but it also shares features of the piston engine in FIG. 3. Components that operate the same are given identical reference numbers as in FIG. 3. In particular, the cooling water circuits of the piston engine in FIG. 4 are numbered with reference numbers 12, 24 and 36 in contrast to FIG. 1. Hence the cooling water flows along the combustion chamber 1 through coolant channels 12, through the cylinder block 2 in coolant channels 24, and in the compressor block 3 through coolant channels 36. The respective channels 12, 24 and 32 are connected in a series. The temperature of the entire engine can be controlled in this manner.

As can be seen, the bushes 62 and the compressor walls 35 directly contact coolant; they are termed "wet bushes" in this context.

The piston engine in FIG. 4 has an outlet 25 in each cylinder 20 that ends in an exhaust manifold 8. Following the manifold 8 is a heat exchanger 80 through which runs the line 32 for the compressed fluid. This preheats the compressed fluid and increases the effectiveness of the engine. The exhaust leaves the engine through an exhaust exit 81.

The sleeve 6 as can be seen in FIG. 4 controls both the outlet 25 and the inlet 23. In addition, the gear arrangement 61 is designed so that the sleeves only rotate one-half as fast as the output shaft 51. In addition, the sleeve 6 is mounted with a slight amount of axial play in its bush 62 so that it slightly follows the stroke of the piston 21. This provides sufficient axial shift for the sleeve 6 to sufficiently distribute lubricant between the sleeve 6 and bush 62.

In addition, the piston engine in FIG. 4 has an annular intake area 37 that is at the end of the piston engine opposite the combustion chamber 1. This intake area 37, is connected to the inlets 34 of the compressor 30 and allows the air to be evenly distributed. In addition, compressor outlets 38 are at this site that lead into a pressure chamber 33 designed as a ring channel.

The inlets 34 and outlets 38 can be closed and opened by valves 52, 53. The valves 52, 53 are controlled via tappets and a lever arrangement 54 by means of a cam arrangement seated on the output shaft 51.

The piston engine in FIG. 5 essentially corresponds to the one in FIG. 4. Components that function identically are given the same reference numbers.

In contrast to the embodiment in FIG. 4, the inlets 34 and outlets 38 for the compressor 30 are controlled by passive valves 56, 57 (shown in detail in FIG. 6). A cam arrangement is hence not used at this site.

As can be seen in detail in FIG. 6, a compressor head 58, serves as a valve seat as is the case with the embodiment in FIG. 4. The inlet valve 56 has a valve cover 56' seated on the compressor that is pulled by a spring 56" against the valve seat 58. The spring 56" is held under pretension by a holder 56'".

The valve opening in the valve seat 58 has a stop 58' (see details of the compressor head 58 in FIG. 6) that the spring 56". contacts when the valve 56 is opened. This cushions the stops in a comparatively easy manner. In addition, the fact that the valve cover 56' is seated on the compressor causes the valve cover 56' to be pressed against the valve seat 58 during compression to provide a seal.

The outlet valve 57 has a ceramic sphere 57' that is pressed against the valve seat 58 by the pressure in the pressure chamber 33. The outlet valve 57 hence remains closed until the pressure in the compressor 30 is below the pressure in the pressure chamber 33. If the pressure in the compressor 30 rises above the pressure in the pressure chamber 33, the ceramic sphere 57' opens and contacts the set screw 57". The path in the pressure chamber 33 is thereby opened, and the cylinder 31 can transfer compressed air into the pressure chamber.

The cylinder head in FIG. 5 also deviates slightly from the embodiment in FIG. 4. In the embodiment in FIG. 5, the outlets 25 are controlled via additional outlet valves 26 instead of via the sleeve 6. This has the advantage of reducing the danger of lubricant entering the exhaust since the valves 26 provide a seal without lubricant. A rotating sleeve contrastingly always leaves a lubricant film that can be entrained by the exhaust stream.

With the embodiment in FIG. 5, the valves 26 are controlled hydraulically via hydraulic lines 27. Springs 28 serve as a resetting mechanism. An alternative is shown in FIGS. 7 and 8. Ceramic spheres 26' serve as valves that close the respective outlets. The spheres are moved via slide valves 29' that can glide back and forth in a slide valve openings 29" by a cam arrangement 29 that rotates with the sleeve 6. This arrangement also ensures that the exhaust at the outlet 25 entrains no oil or lubricant.

The fuel chamber 1 of the piston engine in FIG. 5 (see FIG. 9) is essentially in three parts. It comprises a combustion chamber feed 13, a fuel feed area 14 and a flame area 15.

Fuel is fed by the combustion chamber feed 13 via an injection pump (not shown) and a fuel nozzle 13' to the fuel feed area 14. In addition, the combustion chamber feed 13 has a nozzle 13" that sprays high-pressure compressed fluid from the compressors 30, especially air, through the fuel feed area 14 into the flame area 15. The nozzle 13" has a central nozzle body 13'" that can be adjusted axially via a thread to set a nozzle gap. The nozzle gap is followed by a venturi nozzle 14' that leads into the flame area 15. The air flowing through the venturi nozzle 14' entrains a fuel-air mixture from the fuel feed area 14 into the flame area 15, and a continuous flame is formed.

Next to the venturi nozzle 14' is a compensation opening 14" at the top of the flame area 15 that leads back in the fuel feed area 14. The compensation opening ensures an even flame and the complete combustion of the supplied fuel.

In addition, a spark plug 14'" that is only used to start the engine extends into the fuel feed area 14.

In the flame area 15 is a ceramic tube 15' coaxial with the engine axis that is clamped axially and radially. This ceramic tube abuts the combustion chamber wall against the cooling ribs 15''' radially to the outside in FIG. 9 and can have radial openings 15" in its cylinder-side end (exemplary embodiment in FIG. 5). Compressed medium from feed line 32 reaches the outside of the ceramic tube 15' through a top feed line 32'. The medium flows along the ribs toward the openings 15" and passes through them into the flame area 15. In the flame area 15, the medium flows against the flame direction along the ceramic tube wall before it circulates in the top area of the combustion, chamber 1 and is entrained by the flame. This provides a very effective thermal insulation between the flame in the flame area 15 and the surrounding components.

The fuel chamber 1 also comprises a water cooling system 12 as described above that also cools the direct environment of the flow channels 11 and the fuel chamber floor 16 via cooling channels 12'.

In addition, cooling holes 24' are provided that are fed by the cylinder cooling system 24. These cooling holes 24' are directly next to the flow channels 11. The holes 12' and 24' provide a very high flow rate to counter the high temperatures at these sites.

The piston engine in FIG. 5 has a coaxial hole for an oil feed channel 71 in its output shaft 51. From this oil feed channel 71, radial holes proceed as oil distributors 72 (numbered as an example). Oil is distributed by centrifugal force from the engine rotation by the oil distributors 72 to a desired height in the engine.

In certain components, there are holes 73 (numbered as an example) that also specifically distribute the oil.

There is also a radial hole serving as an oil feed 74 leading from the oil feed channel 71. This ends in a ring channel 75 that is supplied with oil by an oil pump (not shown). The pressure that this causes overcomes the centrifugal force and allows the oil supply channel 71 to be supplied with a sufficient amount of oil.

The connection rods 4 screwed into the pistons 21, 31 grip the camp discs 5 with roller-bearing-mounted rollers 40 (numbered as an example). The connecting rods 4 are divided in two between the rollers 40 (not shown) to make assembly easier. The connecting rods 4 are connected during installation to form a rigid, continuous connecting rod 4. The width of the cam disc 5 between the rollers 40 is such that the unbalance of the piston connecting rod arrangement. This ensures that this single-phase engine runs nearly vibration free. A fine balancing of the overall engine is provided by weights known per se (not shown in the figure) that are placed on the spacer 50.

What is claimed is:

1. A continuous-combustion piston engine in which a working medium flowing from a combustion chamber is successively fed to at least two cylinders, wherein each cylinder is stationary in reference to the combustion chamber and has an inlet, wherein controls are provided that successively connect the inlet to the combustion chamber and separate it from the combustion chamber, wherein at least one inlet can be opened and closed via at least one slide valve, and wherein said continuous-combustion piston engine further comprises an output shaft that is coaxial to the combustion chamber and moves in relation to a cylinder block that holds the cylinders.

2. A piston engine according to claim 1, wherein the slide valve opens and closes in synchrony with rotation of the piston engine.

3. A piston engine according to claim 1, wherein the output shaft has a swash plate which is connected via connecting rods with pistons working in the cylinders.

4. A piston engine according to claim 1, wherein the output shaft has a cam disc along which pistons run that work in the cylinders.

5. A piston engine according to claim 2, wherein each cylinder further comprises an outlet opened and closed by a valve.

6. A piston according to claim 1, wherein the cylinders are symmetrical to the combustion chamber.

7. A piston engine according to claim 1, wherein output from the cylinders is dual flow so as to permit an auxiliary drive selected from the group consisting of oil pump drive, fuel pump drive, and distributor pump drive.

8. A piston engine according to claim 1, further comprising a flow channel from the combustion chamber to each inlet for flowing working medium into the cylinders.

9. A continuous-combustion piston engine in which a working medium flowing from a combustion chamber is successively fed to at least two cylinders, wherein:

(1) each cylinder is stationary in reference to the combustion chamber and has an inlet, (2) controls are provided that successively connect the inlet to the combustion chamber and separate it from the combustion chamber, (3) said continuous-combustion piston engine further comprises an output shaft that is coaxial to the combustion chamber and moves in relation to a cylinder block that holds the cylinders, (4) at least one inlet can be opened and closed via at least one slide valve, (5) the slide valve is a cylindrical sleeve around the piston in the cylinder that has at least one opening corresponding to the inlet, and (6) the opening mates with the inlet in synchrony with the engine rotation.

10. A piston engine according to claim 9, wherein the sleeve rotates around the cylinder axis.

11. A piston engine according to claim 9, wherein the sleeve executes an axial stroke in relation to the cylinder.

12. A piston engine according to claim 9, wherein the sleeve executes a periodic motion whose period is a fraction of the engine speed.

13. A continuous-combustion piston engine in which a working medium flowing from a combustion chamber is successively fed to at least two cylinder, wherein each cylinder has an inlet, and controls are provided that successively connect the inlet to the combustion chamber and separate it from the combustion chamber, and wherein a heat shield with an opening thereon is provided between the combustion chamber and each cylinder.

14. A piston engine according to claim 13, wherein at least one inlet of the cylinders can be opened and closed via at least one slide valve, said slide valve having at least one opening that corresponds to the inlet and mates with the inlet synchronized with the engine rotation, and wherein the slide valve opening and the heat shield opening move in essentially the same direction when the inlet is released.

15. A piston engine according to claim 13, wherein the heat shield can be placed in front of the inlet.

16. A continuous-combustion piston engine in which a working medium flowing from a combustion chamber is successively fed to at least two cylinders, wherein each cylinder has an inlet, and controls are provided that successively connect the inlet to the combustion chamber and separate it from the combustion chamber, wherein the combustion chamber has a rotating combustion chamber floor with at least one flow channel for flowing the working medium from the combustion chamber to the cylinders, and wherein the floor shifts so that the flow channel is successively aligned with at least one inlet of the cylinders.

17. A continuous-combustion piston engine in which a working medium flowing from a combustion chamber is successively fed to at least two cylinders, wherein each cylinder has an inlet, and controls are provided that successively connect the inlet to the combustion chamber and separate it from the combustion chamber, wherein the combustion chamber has a rotating combustion chamber floor with at least one flow channel for flowing the working medium from the combustion chamber to the cylinders, and wherein the floor shifts so that the flow channel is successively aligned with at least one inlet of the cylinders, wherein said piston engine further comprises a heat shield between the combustion chamber and each cylinder, and wherein said heat shield is shifted with the rotating combustion chamber floor.

18. A piston engine according to claim 9, comprising a flow channel extending from the combustion chamber to each inlet.

19. A piston engine according to claim 9, further comprising a piston in each cylinder, and means exist to move the dead center of the pistons in reference to a position of the controls.

20. A piston engine according to claim 9, wherein each cylinder comprises an outlet opened and closed by a valve.

21. A piston engine according to claim 9, wherein there is at least one compressor, which is separate from the cylinders, with the compressor comprising an inlet valve and an outlet valve.

22. A piston engine according to claim 21, wherein at least one of the valves is passive.

23. A piston engine according to claim 21, wherein the inlet valve has a valve cover seated on compressor head of the compressor that is pulled by a spring thereagainst.

24. A piston engine according to claim 21, wherein the inlet valve contacts a stop when it opens, and there is an active spring element between the valve and the stop.

25. A piston engine according to claim 21, wherein the compressor comprises a ball valve as the outlet valve.

26. A piston engine according to claim 21, further comprising an intake chamber that is connected with at least one compressor and is positioned at the end of the engine facing away from the combustion chamber.

27. A piston engine according to claim 9, further comprising a compressor cylinder with a compressor piston that is connected via a compressor connection rod with a working connection rod of a working piston in a working cylinder.

28. A piston engine according to claim 27, wherein there is a rigid connection between the working connection rod and the compressor connection rod.

29. A piston engine according to claim 28, wherein the working connection rod and the compressor connection rod are provided as a common connecting rod.

30. A piston engine according to claim 29, wherein the connecting rod is provided in two parts.

31. A piston engine according to claim 29, wherein the connecting rod comprises two rollers that grasp a cam disc of an output shaft.

32. A piston engine according to claim 31, wherein at least one of the rollers contacts a shoulder or a guide disc that contacts the cam disc radially to the outside.

33. A piston engine according to claim 31, wherein the cam disc has a width selected to provide an unbalance compensates for the unbalance of the piston arrangement.

34. A continuous-combustion piston engine according to claim 1, further comprises an oil feed channel in and coaxial to a central output shaft comprising oil distributors that radiate outward and at least one radial oil feed that receives oil from a pressurized ring channel.

35. A piston engine according to claim 9, comprising a coolant stream that directly contacts a guide in a cylinder.

36. A piston engine according to claim 35, wherein the coolant stream rapidly flows through small holes and is guided directly next to a flow channel.

37. A piston engine according to claim 35, wherein the coolant stream is fed from a cylinder to a compressor.

38. A piston engine according to claim 9, comprising two parallel coolant streams of which one flows through a cylinder block and one which flows through a compressor block, and the coolant streams are in series.

39. A piston engine according to claim 9, wherein each cylinder comprises an outlet, and each outlet is connected to an exhaust manifold that comprises a common exhaust connection.

40. A piston engine according to claim 39, comprises two outlets connected via the exhaust manifold directly to each other via a pressure equalizer.

41. A piston engine according to claim 9, further comprising a compressor that compresses a fluid and feeds it to the combustion chamber, wherein each cylinder comprises an outlet through which the expanded working medium leaves the cylinder, and wherein there is a heat exchanger between the compressor and the combustion chamber that transfers energy from the expanded working medium leaving the outlet of the cylinder to the fluid that is being fed by the compressor to the combustion chamber.

42. A piston engine according to claim 9, wherein the combustion chamber comprises a flame area with a ceramic lining.

43. A piston engine according to claim 42, wherein the ceramic lining is energized with a bias stress at least during operation to prevent tensile force from arising.

44. A piston engine according to claim 42, wherein the ceramic lining has cooling ribs.

45. A piston engine according to claim 9, wherein the combustion chamber has a flame area with openings in a flame area wall through which a fluid can be fed into the flame area.

46. A piston engine according to claim 9, further comprising an injection pump that feeds fuel to the combustion chamber and is controlled by a lambda probe.

47. A piston engine according to claim 46, wherein the lambda probe is at the outlet side after a cylinder.

48. A piston engine according to claim 47, wherein the lambda is controlled at least at a certain load at a minimum of 1.

49. A piston engine according to claim 9, further comprising an injection pump that supplies the combustion chamber with fuel and is controlled by a temperature measurement.

50. A piston engine according to claim 49, wherein the temperature is measured at the outlet side following a cylinder.

51. A piston engine according to claim 49, wherein the temperature is controlled at about 1,000° C., at least while idling.

* * * * *